(No Model.)
A. C. SMITH & H. W. KING.
Tongue Support.
No. 235,465. Patented Dec. 14, 1880.
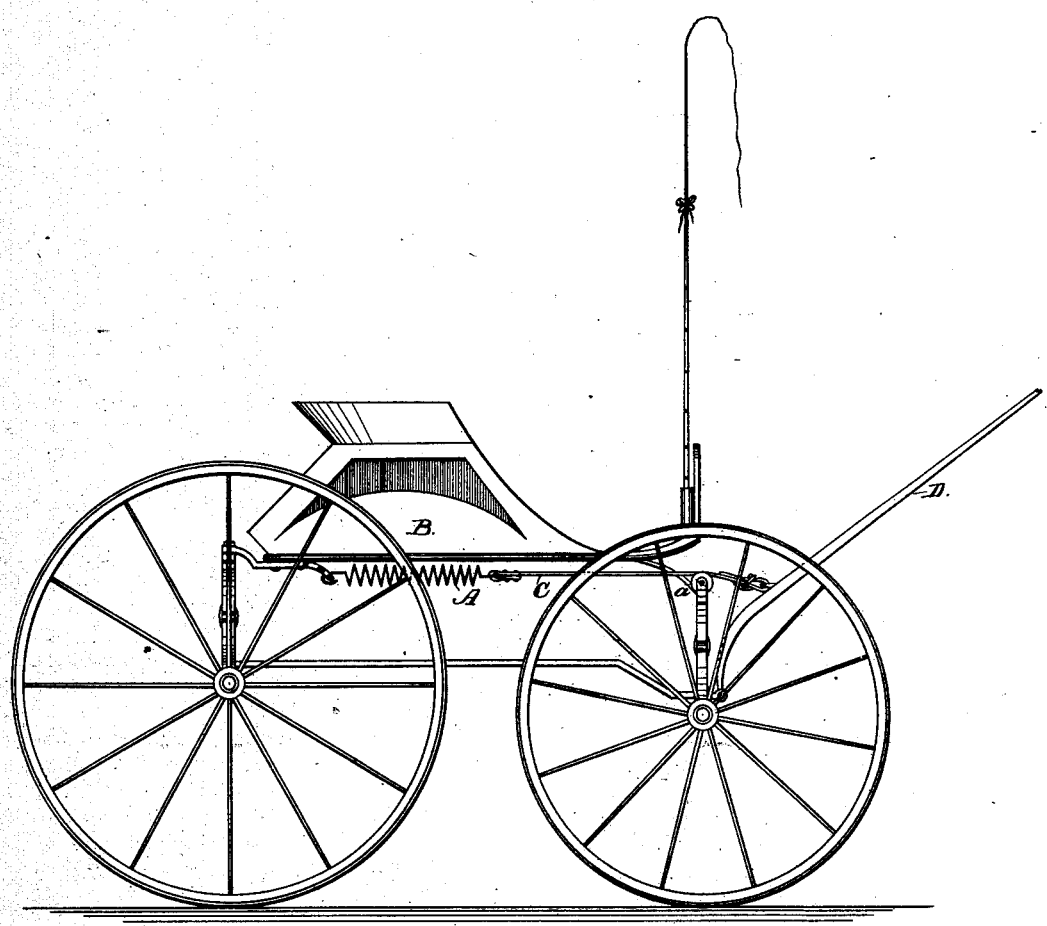
WITNESSES:
W. W. Hollingsworth
Amos W. Hart
INVENTOR:
A. C. Smith
H. W. King
BY
ATTORNEYS.

United States Patent Office.

ALLEN C. SMITH AND HENRY W. KING, OF CANAAN, NEW YORK.

TONGUE-SUPPORT.

SPECIFICATION forming part of Letters Patent No. 235,465, dated December 14, 1880.

Application filed October 22, 1880. (No model.)

*To all whom it may concern:*

Be it known that we, ALLEN C. SMITH and HENRY W. KING, of Canaan, in the county of Columbia and State of New York, have invented a new and Improved Shaft-Support; and we do hereby declare that the following is a full, clear, and exact description of the same:

Our invention relates to an improvement in the class of devices constituting an elastic or yielding support for thills or shafts of vehicles, whereby they are automatically raised and held elevated when the horse is detached, in which position they are less liable to be broken or otherwise injured, besides occupying less of the available floor-space in the carriage-house, and likewise facilitating the re-attachment of the horse when it is desired to use the vehicle again.

Our invention consists in a spring and strap, which are connected and respectively attached to the body of the vehicle and to the thills.

The operation depends on the tension of the spring which overcomes the weight and leverage of the thills and raises them or holds them raised at a suitable height.

In the accompanying drawing we show a side view of a driving-buggy provided with our improved attachment.

The letter A indicates a spiral spring which is attached to the under side of the buggy-box B, and C a strap which is connected with the spring and attached to the cross-bar of the thills D.

The strap C passes over a roller or pulley, *a*, affixed to the front spring-bar of the buggy, so that the friction and wear of the strap are reduced to a minimum.

The aggregate length of the spring and strap is considerably less than the distance between the respective points of attachment of the same to the box B and thills D, and the tension of the spring is designed to be sufficient to raise the thills when the horse is detached, and also hold them at an upward inclination, as shown in full lines, which position is the one desired when the vehicle is not in use.

In order to attach the horse again it is placed in proper position in front of the vehicle, and the thills are then depressed as far as required by overcoming the tension of the spring sufficiently for the purpose.

In case of the harness breaking and the horse becoming thus accidentally detached from the vehicle while driving, the points of the thills will be prevented from striking the ground, so that less danger of injury to the vehicle and its occupants will be incurred.

It is apparent we may employ other forms of springs than that shown, and it is even possible to dispense with the strap and employ the spring alone. In such case it would be preferably attached to the front end of the wagon-box.

What we claim is—

The combination, with the vehicle-body and thills, of the spring and strap, which are connected and attached to the respective parts as shown and described.

ALLEN CURTIS SMITH.
HENRY WOODRUFF KING.

Witnesses:
ASA S. BATES,
EMELINE E. BATES.